Patented Feb. 25, 1941

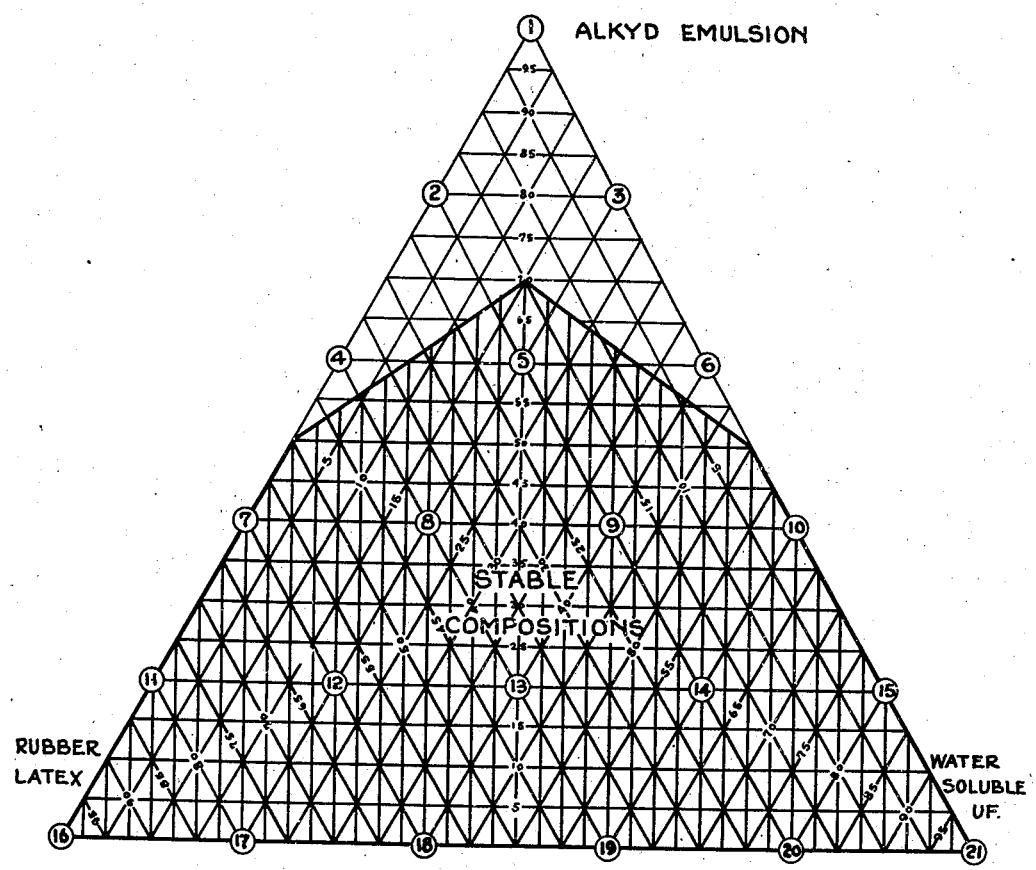

2,233,320

UNITED STATES PATENT OFFICE 2,233,320

PLASTICIZING WATER-SOLUBLE UREA-FORMALDEHYDE RESIN IN AQUEOUS MEDIUM

David William McArthur, Ferndale, Theodore S. Hodgins, Royal Oak, and Almon G. Hovey, Birmingham, Mich., assignors to Reichhold Chemicals, Inc., formerly Beck, Koller & Company, Inc., Detroit, Mich.

Application June 21, 1939, Serial No. 280,388

8 Claims. (Cl. 260—3)

The invention relates to plasticizing resins of the water-soluble urea-formaldehyde type in an aqueous medium, and more particularly to the plasticizing of such resins by maintaining the pH value within a range of 8–10, and adding to the resin a suitable aqueous emulsion.

The invention is particularly applicable to the plasticizing of resins such as set forth in Hodgins and Hovey applications Serial No. 203,148 filed April 20, 1938, now Patent No. 2,185,167 dated December 26, 1939, and Serial No. 234,022 filled October 8, 1938, now Patent No. 2,168,477 dated August 8, 1939, wherein are described water-white, thermo-setting stable resin solutions formed by the co-condensation of urea, formaldehyde, and ethylene glycol.

Various types of aqueous emulsions may be employed for plasticizing the resin. A desirable form of emulsion is an alkyd resin emulsion such as is described in Example 17 of Hodgins and Hovey application Serial No. 270,864 filed April 29, 1939. Another desirable form of emulsion for use in plasticizing resins of the urea formaldehyde type is rubber latex, which consists of gummy particles suspended in an aqueous medium. The latex and alkyd resin emulsion may be mixed together with good results.

There is a great need and desire for plasticizing water-soluble urea formaldehyde resins for industrial purposes with water-soluble plasticizers. Since water-insoluble plasticizers are not miscible with water-soluble urea-formaldehyde resins, it is necessary to incorporate the plasticizers by emulsification. Urea-formaldehyde resins, on account of their water-white color and thermo-setting properties, are very desirable for industrial use, particularly in fabrics, but their use has been decidedly limited on account of their brittleness, in spite of the great advantage in overcoming the lack of stability as outlined in Hodgins and Hovey Patents Nos. 2,185,167 and 2,168,477 by the co-condensation of urea-formaldehyde and ethylene glycol. For the sake of completeness the preparation of such product as described in Examples 1 and 2 of Patent No. 2,168,477 will now be set forth as illustrative of this type of resin:

PREPARATION OF UREA-FORMALDEHYDE ETHYLENE GLYCOL RESIN (*Example 1 of Patent No. 2,168,477*)

243 parts (3 mols) aqueous formaldehyde, 62 parts (1 mol) ethylene gylcol, and 5 parts ammonium hydroxide (26% NH₃) are placed in a flask employing a reflux condenser and agitated for 5 minutes. The 60 parts urea (1 mol) are then added and the mixture heated for 60 minutes at boiling. The product is then cooled to room temperature. This product is characterized by its stability and by resistance to water and alcohol when baked at relatively low temperatures, e. g. 30 min. at 250° F.

This product is found to be acid in its reaction, having a pH value approximately within the range of 4 to 5 due to the presence of free formic acid derived from the formaldehyde which is regenerated upon evaporation of the volatile ammonium ion in the weak salt, ammonium formate, and accordingly the pH value of the solution must be adjusted to bring it within the range of 8 to 10 by the addition of ammonia or other suitable alkaline agent before the alkyd resin emulsion is added.

(*Example 2 of Patent No. 2,168,477*)

The product of Example 1 is made and 0.004–0.005 mols phosphoric acid per mol of urea is added before cooling to room temperature.

This product will bake to a hard, glassy water and alcohol resistant film even when baked as low as 5 minutes at 190° F. (87.8° C.)

Such water-white, thermo-setting, stable urea-formaldehyde resin solutions have heretofore been plasticized only by the use of water-soluble resins and/or water-soluble plasticizers, which, of course, remain permanently water-soluble and thus induce poor water-resistance in the baked urea-formaldehyde film. Among the plasticizers which have been hithertofore used are glycerol, ethylene glycol, and other polyhydroxy compounds, but in using these as plasticizers, the good water-resistance which is inherent in the urea-formaldehyde resins is largely nullified by the use of large amounts of additional polyhydric alcohols. Up to now no water-soluble resin-plasticizer has been found which is water-soluble in the initial stage, but which becomes heat-convertible upon the application of heat and which does not discolor. Also no chemical plasticizer has heretofore been found which will change over from the water-soluble to the water-insoluble state during the baking process.

USE OF ALKYD RESIN EMULSION AS PLASTICIZER

We have found that a urea-formaldehyde resin solution, such for instance as is described in Example 1 of U. S. Patent No. 2,185,167, or of Patent No. 2,168,477, may be plasticized by the use of an alkyd resin emulsion if the pH of the urea-formaldehyde solution is first adjusted to 8–10 by ammonia or some other volatile alkali substance instead of being allowed to remain at 4–5 before the alkyd resin emulsion is introduced. An alkyd resin emulsion, such for instance as is described in Example 17 of Hodgins and Hovey Serial No. 270,864 which has a pH of 8–9, will then blend perfectly with a water-soluble urea-formaldehyde resin solution if the pH of the water-soluble urea-formaldehyde resin solution has been adjusted to 8–10, whereas, were the pH not adjusted to 8–10 prior to the addition, the alkyd resin would precipitate in a very short time. The result of such a combination of equal parts of the urea-formaldehyde resin solution, as in Example 1 of Patent No. 2,185,167, or of Patent No. 2,168,477, and of the emulsion made in Example 17 of Serial No. 270,864 is a water-white, light-colored, flexible film which, upon baking, is converted thus to a water-insoluble state, the heat having converted both the urea-formaldehyde resin and the alkyd resin emulsion in addition to which co-condensation may take place between the two ingredients. An equivalent result is not obtained if a corresponding amount of ammonia is added first to the alkyd resin emulsion, and the emulsion is then stirred into the water-soluble urea-formaldehyde resin. In such case the urea-formaldehyde resin solution must be made alkaline before introducing the emulsion, or else precipitation takes place almost immediately, thus making it impracticable for industrial application. On the other hand, by proceeding in accordance with the present invention, stable emulsions have been obtained which have lasted 1–1½ months without precipitation. The order of mixing is, therefore, important and should be followed according to our examples.

For the sake of completeness the preparation of the alkyd resin emulsion described in Example 17 of Serial No. 270,864 will now be set forth by way of illustration:

PREPARATION OF ALKYD RESIN EMULSION USING EMULSIFYING AGENT No. 1 (T-812):

(Example 17 of Serial No. 270,864)

400 parts by weight of water were heated to 60° C., 22 parts by weight of muriatic casein were added to the water under agitation and 15.2 parts by weight of ammonia (specific gravity, 0.90 and ammonia content, 26%) were added, temperature being maintained at 60° C. under agitation. 0.6 part by weight of phenol was then introduced and the above stirred for ½ hour. At this point, 1.1 parts by weight of emulsifier No. 1 (T-812) were added, and then the resinous phase introduced. The resinous phase was prepared as follows:

The resin which consisted of an alkyl resin, 50% "glycerol phthalate" and 50% soya glyceride, was heated to 90° C. and to 418 parts by weight of this resin was added 10 parts by weight of pine oil and 4 parts by weight of 6% cobalt liquid drier. The resinous phase was added to the aqueous phase gradually with stirring and allowed to agitate for 1 hour.

This emulsion was submitted for a stability test and found to be far greater on stability, according to both accelerated tests and life tests, than a corresponding formula in which various commercial emulsifying agents were employed in the same proportions. The finished emulsion had a non-volatile content of 55% at an alkalinity of 8.5 milligrams of HCl per gram of emulsion, a specific gravity of 1.0469 at 20° C., a pH of 7.8–8.0, and a viscosity of 26 seconds on the No. 4 Ford cup at 25° C.

The preparation of emulsifier No. 1 (T-812) as set forth in Example 3 of Serial No. 270,864 is as follows:

255 parts by weight (0.9 mol) of oleic acid was reacted with 105 parts by weight of 2-amino-2-methyl-1, 3-propanediol in an open vessel. The reaction mass becomes clear at 195° C. Heating was continued to 205° C.; the end point was determined when a pill on glass remained clear. The yield was 320 parts by weight, indicating that approximately 2 mols of water had been eliminated during the course of the reaction. The resulting product is slightly viscous and pale straw color, and capable of forming stable emulsions from resin and oils in aqueous media.

USE OF RUBBER LATEX AS PLASTICIZER

Just as in the case where alkyd resin emulsions are used we have found that by first making the urea-formaldehyde resin solution alkaline (by adjusting the pH to 8–10), it is then possible to add rubber latex without precipitation. On the other hand, the addition of ammonia in an equivalent amount to the rubber latex without previously making the urea-formaldehyde resin solution alkaline to a pH of 8–10, is of no avail, as in such event precipitation will take place. In the present process when using alkyd resin emulsion as a plasticizing agent for urea-formaldehyde resins of this type, the order of mixing is important and should be adhered to. The product resulting from mixing equal parts of urea-formaldehyde resin solution (such as is described in Patent Nos. 2,185,167 and 2,168,477) and of the ordinary rubber latex of commerce is a light-colored, flexible film which has some adhesive properties and elasticity.

Plasticized films of these types are, of course, very desirable for use on textiles, particularly when used in very thin films for printing designs, where light-colored, flexible films which are resistant to laundering are required. The use of the volatile alkalis, such as ammonia, is highly advantageous because there is not left behind any residual water-soluble substances, the ammonia being volatilized upon application of heat. An important industrial use for the product is in the pre-treatment of cord for automobile tires and in the backing of rugs and similar materials. The urea-formaldehyde resins alone might well be used were it not for the fact that flexibilizing with some water-insoluble substance was hithertofore impossible. The uniquely plasticized urea-formaldehyde resins of the present invention are of value in sizing paper, as a cork binder, as a binder in molding plastics, and are also useful as adhesives, as for example in making plywood and in producing laminated structures generally.

Orthodox formulation of the rubber latex itself is to be considered within the scope of this invention, that is, with the inclusion of anti-oxidants, accelerators, vulcanizing agents, etc., which are commonly used with latex. Similarly, alkyl resin emulsions formulated in various ways with the addition of driers, anti-oxidants, anti-skinning agents, etc., are also to be considered within the scope of this invention insofar as they still remain compatible within the pH range effective as outlined. Thermo-setting catalysts, such as the phosphoric acid mentioned in Example 2 of Patent No. 2,168,477, may be added to the water-soluble urea-formaldehyde resin solutions before the adjustment of pH with the volatile alkali, with the net result being that faster thermo-setting properties are obtained with the urea-formaldehyde resin component without destroying the stability of the resulting emulsion.

EXAMPLES 1. 100 parts of 40% urea-formaldehyde resin solution, such as is described in Example 1 of U. S. Patent No. 2,168,477, are made alkaline by the addition of 14 parts of 26% ammonia to secure a pH of 9.0. When the ammonia is well mixed into the urea-formaldehyde solution, 100 parts by weight of a 50% non-volatile alkyd resin aqueous emulsion, such as is described in Example 17 of U. S. Serial No. 270,864, are added. This means a non-volatile content of approximately 40% and a ratio of 4 parts of urea-formaldehyde resin to approximately 5 parts of alkyd resin of the oil-modified type. The pH of the resulting composition is approximately 9.0. The stability of this milky-white emulsion at room temperature is good for at least 4 weeks. The film properties when baked at 260° F. for 15 minutes show uniformity of the resin component, that is, they are smooth and continuous with the film being flexible and slightly elastic.

If the alkyd resin emulsion were stirred into the water-soluble urea-formaldehyde resin solution without adjusting the pH of the latter, precipitation would occur almost immediately upon mixing. The order of mixing is, therefore, important inasmuch as it is not possible to add the alkali to the emulsion without adding it to the urea-formaldehyde resin solution first.

2. 100 parts by weight of urea-formaldehyde resin (as prepared in Example 1 of Patent No. 2,168,477) are made alkaline to a pH of approximately 9.0 by the addition of 14 parts of commercial 26% ammonia. At this point, after being made alkaline, 100 parts by weight of 60% non-volatile rubber latex (concentrated) are stirred in without precipitation. This gives a non-volatile content of approximately 47%, a ratio of 4 parts of urea-formaldehyde resin to 6 parts of rubber latex, and a pH of approximately 9.0. The stability at room temperature has been found to be perfect up to the end of 4½ weeks, whereas precipitation takes place instantly without the addition of the requisite quantity of ammonia to the urea-formaldehyde resin solution. Upon baking the product for 15 minutes at 260° F., a slight separation occurs in the film which indicates a discontinuous film in that the lower film layer adhered to the plate, while the top surface had a tendency to curl under pressure. Such a film is useful as an adhesive inasmuch as it partakes partly of the characteristics of rubber and partly of the characteristics of urea-formaldehyde resin, together with certain unique characteristics of its own, i. e., better temperature strength than plain rubber latex, which is, of course, of value in rubber cements to be used where heat is encountered, such as in automobile body cement. Less amounts of rubber latex than that outlined in this example tend to produce greater uniformity of film, but less elasticity. Decreasing the amount of rubber latex also increases the abrasion-resistance, but induces a greater hardness to the film.

3. A mixture of equal parts of the formulas outlined in Examples 1 and 2 results in a material having a non-volatile content of approximately 43.5%, a pH of 9.0 and a stability of more than 4½ weeks. This film has improved resistance to abrasion as compared with the product of Example 2, but with not so much elasticity. This composition of matter is useful in the production of flexible coatings, in rubber-like cements and adhesives, and in molding compounds.

4. 100 parts by weight of urea-formaldehyde resin solution, such as is described in Example 2 of U. S. Patent No. 2,168,477, is made alkaline with 16 parts by weight of ammonia (26%), and then 100 parts of an alkyd resin aqueous emulsion, such as is described in Example 17 of U. S. Serial No. 270,864, are added. The resulting pH is approximately 8.5, and the non-volatile content approximately 40%, and the stability good after 4½ weeks, as compared in instantaneous precipitation if the order of mixing is not strictly followed. The film properties of this composition of matter are much the same as described in Example 1, except for the fact that the thermo-setting is faster and the hardness at the same temperature of bake is greater.

Further examples are submitted in the following table and the triaxial diagram shown in the accompanying drawing.

TABLE I

| Exp. No. | Parts by weight | | |
|---|---|---|---|
| | Alkyd emulsion 40% solution* | Rubber latex 40% solution | Water-soluble ureaformaldehyde resin 40% solution# adjusted to pH of 9.0 with 26% NH4OH |
| C-1 | 100 | 0 | 0 |
| C-2 | 80 | 20 | 0 |
| C-3 | 80 | 0 | 20 |
| C-4 | 60 | 40 | 0 |
| C-5 | 60 | 20 | 20 |
| C-6 | 60 | 0 | 40 |
| C-7 | 40 | 60 | 0 |
| C-8 | 40 | 40 | 20 |
| C-9 | 40 | 20 | 40 |
| C-10 | 40 | 0 | 60 |
| C-11 | 20 | 80 | 0 |
| C-12 | 20 | 60 | 20 |
| C-13 | 20 | 40 | 40 |
| C-14 | 20 | 20 | 60 |
| C-15 | 20 | 0 | 80 |
| C-16 | 0 | 100 | 0 |
| C-17 | 0 | 80 | 20 |
| C-18 | 0 | 60 | 40 |
| C-19 | 0 | 40 | 60 |
| C-20 | 0 | 20 | 80 |
| C-21 | 0 | 0 | 100 |

*As per Example 17 of U. S. Serial No. 270,864 adjusted to 40% N. V.
As per Example 1 of U. S. Patent No. 2,168,477 at 40% N. V.

The order of mixing the ingredients is the same as outlined in our first four examples. In this table and graph, the emulsion is the same as Example 17 of Serial No. 270,864 and the urea-formaldehyde resin solution is the same as Example 1 of U. S. Patent No. 2,168,477. The rubber latex was adjusted to 40% non-volatile, and so was the alkyd resin emulsion, so that all three components would be on a 40% non-volatile basis. After 4 days at a pH of 9.0, Examples C-1, C-2, C-3, and C-4 and C-6 had separated; Examples C-5 and C-7—C-20, inclusive, were stable; and Example C-21 had separated. The alkyd resin itself is stable if kept within a pH range of 8.0-8.5. The urea-formaldehyde resin is stable at a pH of 4-5, and if ammonia is added to bring the pH up to greater than 5, precipitation takes place, but the pH may be brought as high as 11 and stability of greater than 1 month results if KOH is used instead of ammonia. However, upon adding ammonia to the urea-formaldehyde resin solution and then adding either the latex or the alkyd resin emulsion, as described in the examples, the stability is excellent. Thus, it will be seen that this is not a simple matter of adjustment of pH, inasmuch as the urea-formaldehyde resin solution itself is not stable alone during the alkaline pH range unless definite amounts of either the latex and/or the emulsion are also present to act as mutual stabilizers (see diagram). The rubber latex, of course, is stable for a period of months as received at a pH of 8.5 approximately.

The examples which go to make up the points on the triaxial diagram are given in Table I. The triaxial diagram gives the working area of stability involving the three components at a pH of 9.0 which have industrial importance as outlined in this disclosure. The usefulness of these compositions varies somewhat as to the composition. As will be seen from the diagram, almost any proportion of these three ingredients may be used at a pH of 9.0.

The invention is not necessarily limited to a pH of 9.0, but is effective within a range of 8.0–10.0.

We claim:

1. A process of plasticizing in an aqueous medium a resin of the water-soluble urea-formaldehyde type produced from urea, formaldehyde and ethylene glycol, which comprises adjusting the pH to value within the range of 8–10, and adding a plasticizer comprising latex which also has a pH value within the range of 8–10.

2. A process as set forth in claim 1, wherein the plasticizer is a 60% non-volatile concentrated rubber latex.

3. A process as set forth in claim 1, wherein a mixture of latex and alkyd resin emulsion is employed as the plasticizer.

4. A stable water-soluble plasticized resin produced according to claim 1, which is capable of producing upon baking a water-insoluble, light-colored, flexible elastic film.

5. A stable emulsion comprising a solution of a water-soluble resin derived from urea, formaldehyde and ethylene glycol, and a plasticizer comprising latex, intimately admixed with the resin solution, said emulsion having a pH of 8–10.

6. A process of producing a stable emulsion, comprising adding latex to an aqueous solution of a resin derived from urea, formaldehyde, and ethylene glycol, while maintaining the pH value of the resin solution and of the latex within a range of 8–10.

7. A process of producing a stable emulsion which comprises plasticizing in an aqueous medium a water-soluble resin derived from urea, formaldehyde and ethylene glycol, with the use of latex as a plasticizer, while maintaining the pH value of the composition within the range of 8–10.

8. A stable emulsion comprising an admixture in an aqueous medium of a water-soluble resin derived from urea, formaldehyde and ethylene glycol, and latex as a plasticizer, the pH value of the admixture being maintained within the range of 8–10.

DAVID WILLIAM McARTHUR.
THEODORE S. HODGINS.
ALMON G. HOVEY.